United States Patent Office 3,485,653
Patented Dec. 23, 1969

3,485,653
COATED POLYOLEFIN FILMS AND PROCESS FOR PREPARING THEM
Franco Barbieri Hermitte and Mario Angeletti, Terni, Italy, assignors to Montecatini Edison S.p.A., Milan, Italy, a corporation of Italy
No Drawing. Continuation-in-part of application Ser. No. 439,921, Mar. 15, 1965. This application Mar. 20, 1967, Ser. No. 624,220
Claims priority, application Italy, Mar. 16, 1964, 5,637/64; Mar. 22, 1966, 6,465/66
Int. Cl. B29d 7/22; B44d 1/14
U.S. Cl. 117—7
23 Claims

ABSTRACT OF THE DISCLOSURE

Heat sealable, impermeable polyolefin films prepared by coating a film of a polyolefin, preferably polypropylene consisting prevailingly of isotactic macromolecules, with (1) a first layer of an amine compound selected from polyalkyleneimines, such as polyethyleneimines, polypropyleneimines, etc. and simple amines, such as ethylene diamine, diethylene triamine, tetraethylene pentamine, etc. and (2) a second layer which is capable of reacting with the first layer and comprises a mixture of an epoxy resin with a vinyl or vinylidene homopolymer or copolymer, such as poly (vinyl chloride), poly (vinyl acetate), vinyl chloride/vinyl acetate copolymers, vinyl chloride/vinylidene chloride copolymers, vinylidene chloride acrylonitrile copolymers, etc. In a preferred embodiment the second layer (2) further includes a third component selected from polyalkylacrylates, polyalkylmethacrylates, and copolymers of alkylmethacrylates, with alkylacrylates containing at least about 70%, preferably 85–95%, alkylmethacrylate, wherein the alkyl radical contains from about 1 to 6 carbon atoms.

CROSS-REFERENCE TO RELATED APPLICATIONS

This application is a continuation-in-part of copending application Ser. No. 439,921, filed Mar. 15, 1965, now abandoned.

BACKGROUND OF THE INVENTION

Field of the invention

This invention relates to the preparation of films from alphaolefin polymers which are easily thermosealable and/or impermeable to gases, vapors and the like and which can be used for the manufacture of containers, small envelopes, bags, vessels and manufactured articles to be used by the packing industry.

Description of the prior art

Previously, methods for preparing films from crystalline alphaolefin polymers exhibiting isotactic structure, more particularly from polypropylene consisting prevailingly of isotactic macromolecules and prepared with the aid of stereospecific catalyst, were described.

The praparation, by varied methods, of films stretched in one or two directions, is also known. Films comprising crystalline polyolefins, more particularly polypropylene, have their widest field of application in the packing field, due to their mechanical, protective, and optical properties. However, a great obstacle in the development of applications in this field is presented by the fact that most of the automatic or semiautomatic machines currently in use cannot be used for the processing of the thermoplastic films in the final packing since these machines are not capable of processing or transforming thermoplastic films. This is due to the fact that the automatic or semiautomatic machines currently in use were designed with the characteristics of cellophane in mind inasmuch as cellophane has been the major packing material. The fundamental difference between polyolefin films, more particularly polypropylene films, and cellophane films is the fact that polyolefin films are thermoplastic materials while cellophane is not and undergoes no change in response to heat until its flash point is reached. Thus, the two types of materials behave differently with respect to the automatic thermosealing devices of the usual packing machines. In fact, cellophane is usually coated with a thermoplastic coating, which makes it thermosealable, and it is then sealed without any difficulty. However, polyolefin films, and more particularly polypropylene films, melt upon contact with the sealing elements, tending to adhere to them and to break, thus making it practically impossible to maintain feasible operation of the machine.

It is known that the desired characteristics such as thermosealability and impermeability of films of synthetic polymers can be improved by coating them with materials capable of supplying the desired characteristics. In general the coating is carried out by extrusion coating, by extruding the coating agent in the molten state onto the support film. Another method is the so-called "lamination" of two films with or without adhesives. Yet another method consists of spreading the coating agent dissolved in a suitable solvent. An "anchorage agent" which facilitates the adhesion of the coating to the support can be added to the coating agent. Instead of, or in addition to, the treatment with the anchorage agent the support film is often subjected to a pretreatment with chemical agents, or non-perforating continuous electric discharges, or flames.

SUMMARY OF THE INVENTION

It has now been found that it is possible to obtain thermosealable films from a polypropylene film, whether stretched in two directions or not stretched, by coating it with a multilayer coating consisting of:

(1) a layer of an amine compound, either polymeric or not; and
(2) a layer capable of reacting with layer (1) and comprising a mixture of an epoxy resin with a homopolymer or copolymer capable or rendering the support film thermosealable and/or impermeable to gases and vapors.

Particularly advantageous results, including films having a remarkably improved sealing strength of at least about 250 g./cm. as well as the possibility of closely controlling and limiting variation of the sealing strength of the films, are achieved when the second layer (2) further includes a third component selected from the polyalkylacrylates, polyalkylmethacrylates, and copolymers of alkylmethacrylates with alkylacrylates containing at least about 70%, preferably 85–95%, alkylmethacrylate, wherein the alkyl radical contains from about 1 to 6 carbon atoms.

DESCRIPTION OF THE PREFERRED EMBODIMENTS

The first layer (1) preferably comprises an alkyleneimine polymer or a non polymeric amine compound which have a general formula $NH_2$—$(CHR$—$CH_2$—$NH)_n$—$H$ in which R is a hydrogen atom or a methyl group and $n$ is an integer from 1 to 116; they are more precisely polyethyleneimines, polypropylleneimines and the corresponding non-polymeric amine compounds such as ethylene diamine, diethylene triamine, tetraethylene pentamine and the like.

The second layer (2) preferably comprises a member selected from the group consisting of polyvinylchloride, polyvinylidenechloride, polyvinylacetate, vinyl chloride copolymers, vinylidene chloride copolymers and vinylacetate copolymers (C. GE. Schildknecht, vinyl and related polymers, by J. Wiley, N.Y. (1952) pages 398–412–453–461; 466–475) in admixture with an epoxy resin capable of reacting with the amine compound of the first layer. In a presently preferred embodiment, the second layer further includes a third component selected from polyalkylacrylates, polyalkylmethacrylates, and copolymers of alkylmethacrylates with alkylacrylates containing at least about 70%, preferably 85–95%, alkylmethacrylate, wherein the alkyl radical contains from about 1 to 6 carbon atoms.

Among the vinyl and vinylidene homopolymers and copolymers particularly suitable for the purposes of this invention are the homopolymers of vinyl chloride and vinyl acetate and the copolymers of vinyl chloride with vinylacetate, vinyl chloride with vinylidene chloride, and vinylidene chloride with acrylonitrile. Among the epoxy resins particularly suitable are the condensation products of epichlorohydrin with phenols. Among the polymers of acrylic and methacrylic esters which are particularly suitable are polymethyl-, polyethyl- and polyisobutyl-acrylates and methacrylates and the copolymers of methyl methacrylate with other esters of acrylic or methacrylic acid in which methylmethacrylate is present in a molar amount of at least 70%.

The coating can be applied on a film which may previously have been stretched in two directions and may or may not have been subjected to electric treatment. Also, it can be applied to an unstretched film or to a film which has been stretched in a single direction. The stretching or stretchings may be carried out after coating. The electric treatment of the film is preferably carried out with discharging devices which are fed with an alternating current potential of 200–500 volts and 50–60 Hz. and produce in a discharging space where the film is passed, e.g., between an output electrode and a grounded roller (driving the film) a potential of 3,000–10,000 volts at a frequency of 8,000–16,000 Hz. which is capable of generating a sufficient amount of ozone to modify the film surface and render it receptive to inks, adhesives, etc. Devices of this type may be of the SCAE type, particularly the apparatus having a power of 6 kw. fed with 500 v. at 50 Hz. and giving a discharging current of 0.1 ampere, or of the Lepel Inc. type (particularly the Model HFSG/6). Other similar devices are also suitable. The coating can be applied either on one or both faces of the polyolefin film, when the film is stretched in one direction, two directions, or not stretched at all.

As regards the weight ratios of the components of the second layer (2), it is preferred to use the following ratios: when are present only the components (a) and (b) they are generally comprised between 70:30 and 95:5; where also component (c) is employed, this one is generally used in amounts from 5 to 40% by weight per 100 parts of components (a)+(b).

The coatings may be applied from solutions or dispersions of the coating materials in water or in organic solvents according to the usual methods, e.g. by spreading, immersion or similar operations. The total thickness of the coatings may vary from 1 to 20 microns, that is due almost exclusive to the second layer (2) since the thickness of the first layer (1) cannot be measured with the traditional measuring instruments.

The degree of adhesion of the coating to the support film is measured by placing a section of adhesive cellulose tape under pressure on the surface of the coated film and then stripping it immediately from the surface. The coatings having excellent adhesion should remain firmly attached to the support film; the coatings having poor adhesion are partially or completely removed from the support film.

The adhesion also may be measured with the "peeling test" by determining, by means of a dynamometer, the tensile strength of the sealing. The peeling test valves are considered good if they exceed 80–100 g./cm. It should be noted that the value of the sealing strength must be considered in relation to the type of application for which the coated film is intended. Thus, 100 g./cm. is considered a very good value if the application is, e.g., the sealing of a coated film intended to contain cigarettes. If the coated film is intended to contain rice, sugar and the like, however, higher sealing strengths are required.

The supports to which the thermosealable coatings are applied in accordance with the present invention are preferably films obtained from polypropylene prepared with stereo-specific catalysts or ethylene polymers to which additives, such as stabilizers, lubricants, plasticizers, dyeing pigments, antistatic agents, fillers and the like can be added before extrusion.

The process of the invention is carried out on an unstretched film or on a film which has been stretched in only one direction and the coated film is thereafter stretched in at least one direction to thereby render the coating very thin.

The following examples are presented to further illustrate the invention without limiting its scope.

EXAMPLE 1

A film of polypropylene consisting essentially of isotactic macromolecules was subjected to electronic treatment with a device (McKelvey, Polymer Processing, Ed. 1962, J. Wiley, pages 161 et seq.) of the SCAE type (6 kw., fed with a tension of 500 v. at 50 Hz. and giving a discharging current of 0.1 ampere) and was coated on one side, using a normal spreading and coupling machine for thin films, with a 1% solution of polyethyleneimine in water; as polyethyleneimine was used the commercial product "Polymin P." of the BASF, having a mol weight of 5000. The film was then dried in an oven at 80° C. and coated with a second layer consisting of a mixture of:

(1) a vinyl chloride-vinylacetate copolymer (87–13) (having a Fikentscher's value K=50), 85% by weight
(2) an epoxy resin obtained by polycondensation of epichlorohydrin with bisphenol A and having an average molecular weight of 450, 15% by weight.

The mixture of the two polymers was applied in the form of a 20% solution in methylethylketone prepared at room temperature. After spreading, the film was dried at 90° C.

The coated film had the following characteristics:

Thickness of the coating _____ 2 microns.
Adhesion (Scotch tape test) _____ Good (100%).
Blocking at 43° C. _____ Absent.
Transparency _____ Good.
Slip _____ Good.
Sealing strength (peeling test at room temperature) of sealing carried out at 120° C. _____ 155 g./cm.

EXAMPLE 2

A film of polypropylene consisting essentially of isotactic macromolecules was subjected to an electronic treatment with a device of the SCAE type and then coated on one side, using a normal spreading and coupling machine for thin films, with a 1% solution of polyethyleneimine in water. The film was then dried in an oven and coated with a second layer consisting of a mixture of:

(1) a vinyl chloride-vinylacetate copolymer (87–13) (having a Fikentscher's value K=40), 85% by weight
(2) an epoxy resin obtained by polycondensation of epichlorohydrin with bisphenol A and having an average molecular weight of 450, 15% by weight.

The mixture of the two polymers was applied in the form of a 20% solution in methylethylketone prepared at room temperature. After spreading, the film was dried at 90° C.

The coated film had the following characteristics:

| | |
|---|---|
| Thickness of the coating | 2 microns. |
| Adhesion (Scotch tape test) | Good (100%). |
| Blocking at 43° C. | Absent. |
| Transparency | Good. |
| Slip | Good. |
| Sealing strength (peeling test at room temperature) of sealing carried out at 120° C. | 190 g./cm. |

EXAMPLE 3

A film of polypropylene consisting essentially of isotactic macromloecules was subjected to an electronic treatment with a device of the SCAE type and then coated on one side, using a normal spreading and coupling machine for thin films, with a 1% solution of polyethyleneimine in water. The film was then dried in an oven and coated with a second layer consisting of a mixture of:

(1) a vinyl chloride vinylacetate copolymer (87–13) (having a Fikentscher's value K=32), 85% by weight
(2) an epoxy resin obtained by polycondensation of epichlorohydrin with bisphenol A and having an average molecular weight of 450, 15% by weight.

The mixture of the two polymers was applied in the form of a 20% solution in methylethylketone prepared at room temperautre. After spreading, the film was dried at 90° C.

The coated film had the following characteristics:

| | |
|---|---|
| Thickness of the coating | 2 microns. |
| Adhesion (Scotch tape test) | Good (100%). |
| Blocking at 43° C. | Absent. |
| Transparency | Good. |
| Slip | Good. |
| Sealing strength (peeling test at room temperature) of sealing carried out at 120° C. | 230 g./cm. |

EXAMPLE 4

(A) A film of polyproplene consisting essentially of isotactic macromolecules was subjected to an electronic treatment with an SCAE type device and then coated on one side, using a normal spreading and coating machine for thin films, with a 1% solution of polyethyleneimine in water. The film was then dried in an oven and coated with a second layer consisting of a mixture of:

(1) a vinyl chloride-vinylacetate copolymer (55–45) (having a Fikentscher's value K=42), 85% by weight
(2) an epoxy resin obtained by polycondensation of epichlorohydrin with bisphenol A and having an average molecular weight of 450, 15% by weight.

The mixture of the two polymers was applied in the form of a 20% solution in methylethylketone prepared at room temperature. After spreading, the film was dried at 90° C. The coated film had the following characteristics:

| | |
|---|---|
| Thickness of the coating | 2 microns. |
| Adhesion (Scotch tape test) | Good (100%). |
| Blocking at 43° C. | Absent. |
| Transparency | Good. |
| Slip | Good. |
| Sealing strength (peeling test at room temperature) of the sealing carried out at 120° C. | 215 g./cm. |

(B) For purposes of comparison, a second sample of the film which had undergone the electronic treatment and then been given the first coating with the 1% water solution of polyethyleneimine was given a second coating consisting only of the vinyl chloride-vinylacetate copolymer (K=42) without any epoxy resin. The film had the following characteristics:

| | |
|---|---|
| Thickness of the coating | 2 microns. |
| Adhesion (Scotch tape test) | Delamination occurs. |
| Sealing strength (peeling test at room temperature) of the sealing carried out at 120° C. | 70 g./cm. |

EXAMPLE 5

A film of polypropylene consisting essentially of isotactic macromolecules was subjected to an electronic treatment with an SCAE device and then coated on one side, using a normal spreading and coupling machine for thin films, with a 1% solution of tetraethylenepentamine in water. The film was then dried in an oven and coated with a second layer consisting of a mixture of:

(1) a vinyl chloride-vinylacetate copolymer (87–13) (having a Fikentscher's value K=40); 85% by weight
(2) an epoxy resin obtained by polycondensation of epichlorohydrin with bisphenol A having an average molecular weight of 450, 15% by weight.

The mixture of the two polymers was applied in the form of a 20% solution in methylethylketone prepared at room temperature. After spreading, the film was dried at 90° C. The coated film had the following characteristics:

| | |
|---|---|
| Thickness of the coating | 2 microns. |
| Adhesion (Scotch tape test) | Good (100%). |
| Blocking at 43° C. | Absent. |
| Transparency | Good. |
| Slip | Good. |
| Sealing strength (peeling test at room temperature) of the sealing carried out at 120° C. | 185 g./cm. |

EXAMPLE 6

A film of polypropylene consisting essentially of isotactic macromolecules was subjected to an electronic treatment with an SCAE device and then coated on one side, using a normal spreading and coupling machine for thin films, with a 1% solution of polyethyleneimine in water. The film was the dried in an oven and coated with a second layer consisting of a mixture of:

(1) a vinyl chloride-vinylacetate copolymer (87–13) (having a Fikentscher's value K=50), 85% by weight
(2) an epoxy resin obtained by polycondensation of epichlorohydrin with bisphenol A having an average molecular weight of 900, 15% by weight.

The mixture of the two polymers was applied in the form of a 20% solution in methylethylketone prepared at room temperature. After spreading, the film was dried at 90° C. The coated film had the following characteristics:

| | |
|---|---|
| Thickness of the coating | 2 microns. |
| Adhesion (Scotch tape test) | Good (100%). |
| Blocking at 43° C. | Absent. |
| Transparency | Good. |
| Slip | Good. |
| Sealing strength (peeling test at room temperature) of the sealing carried out at 120° C. | 148 g./cm. |

EXAMPLE 7

A film of polypropylene consisting essentially of isotactic macromolecules was subjected to an electronic treatment with an SCAE device and then coated on one side, using a normal spreading and coating device for thin film, with a 1% solution of polyethyleneimine in water. The film was then dried in an oven and coated with a second layer consisting of a mixture of:

(1) polyvinylacetate (having a Fikentscher's value K=50), 85% by weight
(2) an epoxy resin obtained by polycondensation of epichlorohydrin with bisphenol A and having an average molecular weight of 450, 15% by weight.

The mixture of the two polymers was applied in the form of a 20% solution in methylethylketone prepared at room temperature.

After spreading, the film was dried at 90° C. The coated film had the following characteristics:

Thickness of the coating _____ 2 microns.
Adhesion (Scotch tape test) _____ Good (100%).
Blocking at 43° C. _____ Absent.
Transparency _____ Good.
Slip _____ Good.
Sealing strength (peeling test at room temperature) of the sealing carried out at 120° C. _____ 230 g./cm.

EXAMPLE 8

(A) A film of polypropylene consisting essentially of isotactic macromolecules was subjected to an electronic treatment with an SCAE device and then coated on one side, using a normal spreading and coating machine for thin films, with a 1% solution of polyethyleneimine in water. The film was then dried in an oven and coated with a second layer consisting of a mixture of:

(1) a vinylidene chloride-acrylonitrile copolymer (80–20) (Saran F220), 80% by weight
(2) an epoxy resin obtained by polycondensation of epichlorohydrin with bisphenol A and having an average molecular weight of 450, 20% by weight.

The mixture of the two polymers was applied in the form of a 20% solution in methylethylketone prepared at room temperature. After spreading, the film was dried at 90° C. The coated film had the following characteristics:

Thickness of the coating _____microns____ 2
Adhesion (Scotch tape test) _____ good 100%
Blocking at 43° C. _____ Absent
Transparency _____ Good
Slip _____ Good
Sealing strength (peeling test at room temperature) of the sealing carried out at 130° C. _____g./cm____ 157

(B) For purposes of comparison a second sample of the film which had undergone the electronic treatment and then been given the first coating with the 1% water solution of polyethyleneimine was given a second coating consisting only of the vinylidene chloride-acrylonitrile copolymer (Saran F220) without any of the epoxy resin. This film had the following characteristics:

Thickness of the coating_____ 2 microns.
Adhesion (Scotch tape test) _____ Delamination occurs.
Sealing strength (peeling test at room temperature of the sealing carried out at 130° C.) _____ 90 g./cm.

As can be seen from the above comparison test as well as from that of Example 4, the presence of the epoxy resin in the second layer avoids delamination and increases the sealing strength.

The elimination of the delamination is essential to the commercial success of the multilayer films. It is also to be noted that film coated with only one layer of polyimine cannot be compared with the multilayer films of the invention as it cannot be wound on bobbins because of its high blocking at 43° C.

EXAMPLE 9

A film of polypropylene consisting essentially of isotactic macromolecules was subjected to an electronic treatment with an SCAE device and then coated on one side, using a normal spreading and coupling machine for thin films, with a 1% solution of polyethyleneimine in water. The film was then dried in an oven and coated with a second layer consisting of a mixture of:

(1) a vinylidene chloride-vinylchloride copolymer (85–15) (commercial product QX–2168), 80% by weight
(2) an epoxy resin obtained by polymerization of epichlorohydrin with bisphenol A and having an average molecular weight of 450, 20% by weight The mixture of the two polymers was applied in the form of a 20% solution in methylethylketone prepared at room temperature. After spreading, the film was dried at 90° C. The coated film had the following characteristics:

Thickness of the coating _____microns____ 2
Adhesion (Scotch tape test) _____ Good 100%
Blocking at 43° C. _____ Absent
Transparency _____ Good
Slip _____ Good
Sealing strength (peeling test at room temperature) of the sealing carried out at 130° C. _____g./cm____ 170

The film thus coated was also hardly permeable to gases and vapors.

EXAMPLE 10

A film of polypropylene consisting essentially of isotactic macromolecules was subjected to electronic treatment with a device of the SCAE type and then coated on one side, using a normal spreading and coupling machine for thin films, with a 1% solution of polyethyleneimine in water. The film was then dried in an oven and coated with a second layer consisting of a mixture of:

(1) a vinylchloride-vinylacetate copolymer (87–13) (having a Fikentscher's value K=32), 80% by weight
(2) an epoxy resin obtained by polycondensation of epichlorohydrin with bisphenol A, and having an average molecular weight of 450, 5% by weight
(3) polymethylmethacrylate having a specific viscosity measured in chloroform at 20° C. [η]=0.20, 15% by weight The mixture of the three polymers was applied in the form of a 20% solution in methyethylketone prepared at room temperature. After spreading, the film was dried at 90° C. The coated film had the following characteristics:

Thickness of the coating _____microns____ 2
Adhesion (Scotch tape test) _____ Good 100%
Blocking at 43° C. _____ Absent
Transparency _____ Good
Slip _____ Good
Sealing strength (peeling test at room temperature) of the sealing carried out at 120° C. _____g./cm__ [1] 280

[1] Variation of the values: 250–310 g./cm.

In an analogous test without polymethylmethacrylate, in which the same weight ratios of vinyl copolymer/epoxy resin as those used in the three component mixture were used, the sealing strength was 200 g./cm. with variations of the values of from 200 to 300 g./cm.

EXAMPLE 11

A film of polypropylene consisting essentially of isotatic macromolecules was subjected to an electronic treatment with a device of the SCAE type and then coated on one side, using a normal spreading and coupling machine for thin films, with a 1% solutions of polyethyleneimine in water. The film was then dried in an oven and coated with a second layer consisting of a mixture of:

(1) a vinylchloride-vinylacetate copolymer (87–13) (having a Fikentscher's value K=40), 80% by weight
(2) an epoxy resin obtained by polycondensation of epichlorohydrin with bisphenol A and having an average molecular weight of 450, 5% by weight (3) polymethylmethacrylate having an inherent viscosity measured in chloroform at 20° C. [η]=0.25, 15% by weight The mixture of the three polymers was applied from a 20% solution in methylethylketone prepared at room temperature. After spreading, the film was dried at 90° C. The coated film had the following characteristics:

Thickness of the coating _____microns__ 2
Adhesion (Scotch tape test) _____ Good (100%)
Blocking at 43° C. _____ Absent
Transparency _____ Good
Slip _____ Good
Sealing strength (peeling test at room temperature) of the sealing carried out at 120° C. ____g./cm__ 220

In an analogous test without polymethacrylate, in which the same weight ratios of vinyl copolymer/epoxy resin as used in the three component mixture were used, the sealing strength was 185 g./cm.

EXAMPLES 12–15

By operating in accordance with the procedure of Example 10, coated polypropylene films were prepared, the only difference being that, in place of polymethylmethacrylate in the second layer, other homopolymers or copolymers of acrylic or methacrylic acid esters were used. In the following table there are reported the products used and the sealing strength of the coated films:

TABLE

| Product | Sealing strength at 120° C., g./cm. |
|---|---|
| Example: | |
| 12 _____ 90/10 methylmethacrylate/methylacrylate copolymer, [η]=0.19_____ | 260 |
| 13 _____ 90/10 methylmethacrylate/butylmethacrylate copolymer, [η]=0.22___ | 260 |
| 14 _____ Polybutylmethacrylate, [η]=0.53_____ | 265 |
| 15 _____ Polyisobutylmethacrylate, [η]=0.66_____ | 270 |

Variations can, of course, be made without departing from the spirit and scope of the invention.

Having described our invention, what we desire to secure by Letters Patent and hereby claim is:

1. A coated heat sealable films comprising a polypropylene film, said film being coated with (1) a first layer comprising a member selected from the group consisting of a polyalkyleneimine and a non-polymeric amine compound having a general formula

NH₂—(CHR—CH₂—NH)ₙ—H in which R is a hydrogen atom or a methyl group and n is an integer from 1 to 116 and (2) a second layer capable of reacting with said first layer and comprising a mixture of (a) an epoxy resin comprising a condensation product of an epihalohydrin with a phenol; and (b) a polymer selected from the group consisting of the homopolymers of vinyl chloride, vinylidene chloride and vinyl acetate and the copolymers thereof with each other or with another ethylenically unsaturated monomer capable of polymerizing therewith, said coating having a thickness of from about 1 to 20 microns.

2. The coated film of claim 1 wherein said second layer (2) further comprises a third component (c) selected from the group consisting of polyalkylacrylates, polyalkylmethacrylates and copolymers of at least about 70 mol percent alkylmethacrylates with correspondingly, up to about 30 mol percent alkylacrylates, wherein the alkyl radical contains from about 1 to 6 carbon atoms.

3. The coated film of claim 1 wherein said polypropylene consists prevailingly of isotactic macromolecules.

4. The coated film of claim 2 wherein said polypropylene consist prevailingly of isotactic macromolecules.

5. The coated film of claim 1 wherein said first layer comprises a polyalkyleneimine selected from the group consisting of polyethyleneimine and polypropyleneimine.

6. The coated film of claim 1 wherein said first layer comprises polyethyleneimine.

7. The coated film of claim 1 wherein said first layer comprises ethylenediamine.

8. The coated film of claim 1 wherein said first layer comprises diethylenetriamine.

9. The coated film of claim 1 wherein said first layer comprises tetraethylenepentamine.

10. The coated film of claim 1 wherein said epoxy resin is a polycondensate of epichlorophydrin with bisphenol A.

11. The coated film of claim 1 wherein component (b) of said second layer is a copolymer of vinyl chloride with vinylacetate.

12. The coated film of claim 1 wherein component (b) of said second layer is polyvinylacetate.

13. The coated film of claim 1 wherein component (b) of said second layer is a copolymer of vinylidene chloride with acrylonitrile.

14. The coated film of claim 1 wherein component (b) of said second layer is a copolymer of vinylidene chloride with vinylchloride.

15. The coated film of claim 2 wherein said component (c) is selected from the group consisting of polymethylacrylate, polyethylacrylate, polybutylacrylate, polyisobutylacrylate, polymethylmethacrylate, polyethylmethacrylate, polybutylmethacrylate and polyisobutylmethacrylate.

16. The coated film of claim 2 wherein said component (c) is polymethylmethacrylate.

17. The coated film of claim 2 wherein said component (c) is a copolymer of methylmethacrylate with methylacrylate.

18. The coated film of claim 2 wherein said component (c) is a copolymer of methylmethacrylate with butylmethacrylate.

19. The coated film of claim 2 wherein said component (c) is polybutylmethacrylate.

20. The coated film of claim 2 wherein said component (c) is polyisobutylmethacrylate.

21. A process for preparing the coated film of claim 1 which comprises coating a polypropylene support comprising a polypropylene film on at least one side with (1) a first layer comprising a member selected from the group consisting of a polyalkyleneimine and a non-polymeric amine compound having a general formula

NH₂—(CHR—CH₂—NH)ₙ—H in which R is a hydrogen atom or a methyl group and n is an integer from 1 to 116; and (2) a second layer capable of reacting with said first layer and comprising a mixture of (a) an epoxy resin comprising a condensation product of an epihalohydrin with a phenol; and (b) a polymer selected from the group consisting of the homopolymers of vinyl chloride, vinylidene chloride and vinyl acetate and the copolymers thereof with each other or with another ethylenically unsaturated monomer capable of polymerizing therewith, said coating having a thickness of from about 1 to 20 microns, each of said layers being applied from a solution or dispersion of said coating material followed by drying.

22. The process of claim 21 wherein at least one of said coating layers includes a member selected from the group consisting of stabilizers, lubricants, dyestuffs and antistatic agents.

23. The process of claim 21 wherein one or both coatings is carried out on an unstretched film or on a film which has been stretched in only one direction and the coated film is thereafter stretched in at least one direction to thereby render the coating very thin.

References Cited

UNITED STATES PATENTS

| | | | |
|---|---|---|---|
| 3,111,418 | 11/1963 | Gilbert et al. | |
| 3,202,528 | 8/1965 | James | 117—161 |
| 3,256,239 | 6/1966 | Williamson | 117—138.8 |
| 3,276,899 | 10/1966 | Muhlberg et al. | 117—161 X |
| 3,285,766 | 11/1966 | Barkis et al. | 117—7 |
| 3,286,009 | 11/1966 | Yumoto et al. | 117—7 X |
| 3,335,029 | 8/1967 | Holben | 117—122 X |

ALFRED L. LEAVITT, Primary Examiner

A. GRIMALD, Assistant Examiner

U.S. Cl. X.R.

117—47, 72, 138.8, 161

PO-1050
(5/69)

UNITED STATES PATENT OFFICE
CERTIFICATE OF CORRECTION

Patent No. 3,485,653      Dated December 23, 1969

Inventor(s) Franco Barbieri Hermitte and Mario Angeletti

It is certified that error appears in the above-identified patent and that said Letters Patent are hereby corrected as shown below:

Column 1, line 61, "praparation" should read -- preparation --. Column 2, line 69, "polypylleneimines" should read -- polypropyleneimines --. Column 5, line 31, "temperautre" should read -- temperature --. Column 6, line 43, "the dried" should read -- then dried --. Column 7, line 37, "microns -2" should read -- 2 microns --; line 38, "Good 100%" should read -- Good (100%) --; line 44, "g/cm -157" should read -- 157 g/cm line 65, "that film" should read -- that a film --. Column 8, line 13, "microns -2" should read -- 2 microns --; line 14, "Good 100%" should read -- Good (100%) --; line 47, "microns -2" should read -- 2 microns --; line 48, "Good 100%" should read -- Good (100%) --; line 53, "g/cm -280" should read -- $^1$280 g/cm --. Column 9, line 8, "microns -2" should read -- 2 microns --; line 44, "films" should read -- film --. Column 10, line 8, "epichlorophydrin" should read -- epichlorohydrin --.

SIGNED AND
SEALED

JUN 30 1970

(SEAL)
Attest:

Edward M. Fletcher, Jr.
Attesting Officer

WILLIAM E. SCHUYLER, JR.
Commissioner of Patents